Aug. 22, 1961  D. W. BARTON  2,996,882
LIQUID FUEL AND AIR PUMPING UNIT
Filed July 2, 1954  2 Sheets-Sheet 1
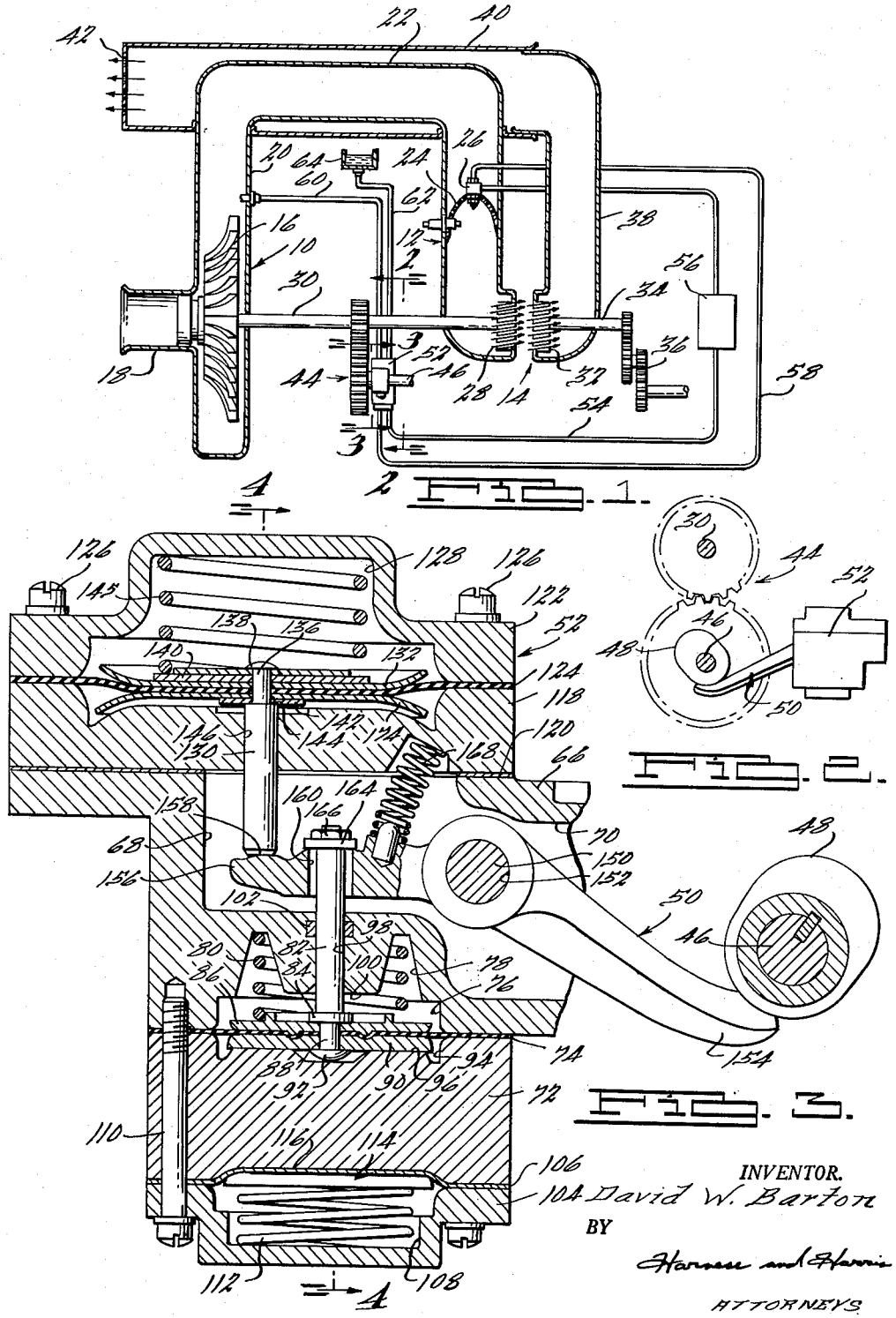
INVENTOR.
David W. Barton
BY
Harness and Harris
ATTORNEYS

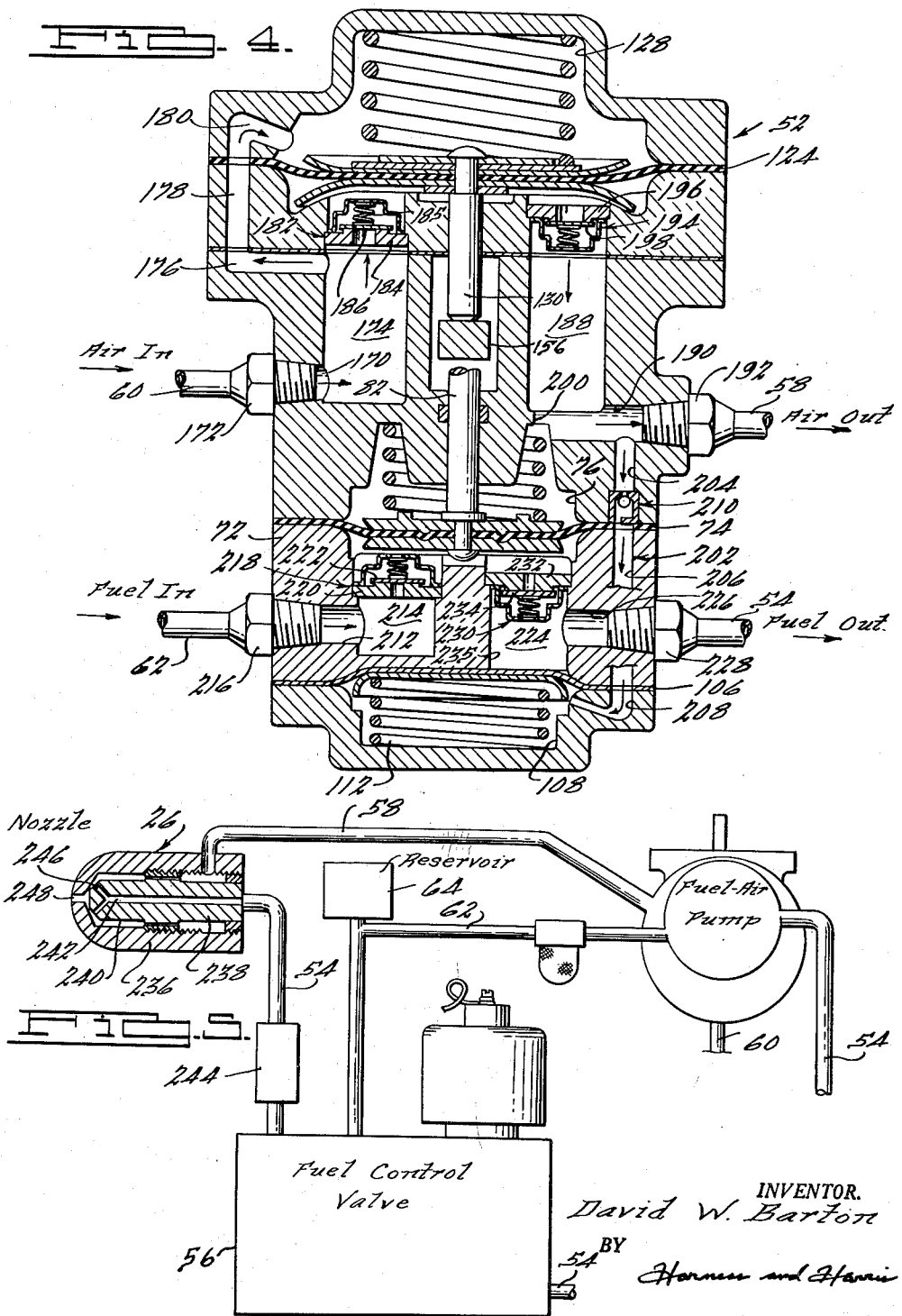

United States Patent Office 2,996,882
Patented Aug. 22, 1961

2,996,882
LIQUID FUEL AND AIR PUMPING UNIT

David W. Barton, Birmingham, Mich., assignor to Chrysler Corporation, Highland Park, Mich., a corporation of Delaware
Filed July 2, 1954, Ser. No. 440,952
9 Claims. (Cl. 60—39.27)

My present invention relates generally to fuel control systems for use with liquid fuel combustion apparatus. More particularly, my invention relates to a new and improved pumping unit for supplying both liquid and air to a liquid fuel air atomizing nozzle or the like, said pumping unit and said nozzle being adapted to form a portion of such a fuel control system.

The pumping unit of my instant invention is especially adapted to be used with the fuel system of a gas turbine power plant although it will readily become apparent that it is also capable of many other uses.

Such a gas turbine power plant normally comprises a liquid fuel combustion chamber for producing motive gases and a first turbine stage which is adapted to be powered by these motive gases. The first turbine stage may be drivably connected to an air compressor unit which in turn is adapted to supply the gas turbine combustion chamber with a supply of compressed intake air for supporting combustion of the liquid fuel. The motive gases then pass from the first turbine stage to a second stage and impart a driving torque to the latter. This second turbine stage may be drivably connected to a suitable power absorbing driven means such as the drive shaft of an automotive vehicle or the like.

The above-mentioned liquid fuel air atomizing nozzle may be operatively associated with the power plant combustion chamber and is adapted to utilize a flow of air to atomize a controlled flow of liquid fuel and to thereby produce a combustible spray pattern of liquid fuel within the combustion chamber, the fuel and air being supplied to the nozzle by the pumping unit as above set forth. A fuel control valve mechanism may be interposed between the pumping unit and the nozzle for the purpose of regulating the rate of the above-mentioned flow of liquid fuel.

As the speed of the turbine elements of the power plant increases, the pressure within the combustion chamber is also increased, and consequently, the back pressure on the liquid fuel nozzle is of a greater magnitude at high operating speeds than it is at lower operating speeds. It is desirable to maintain a susbtantially constant pressure differential across the liquid fuel nozzle in order to maintain uniform fuel dispersion within the combustion chamber throughout the operating speed range of the power plant and therefore the delivery pressures of the liquid fuel and air being supplied to the nozzle must be varied in order to compensate for corresponding variations in the nozzle back pressure. Therefore, the operating characteristics of the fuel and air pumping unit must be such that the fuel and air delivery pressures are greater than the pressure within the combustion chamber by a predetermined amount during the operation of the power plant.

The fuel flow control valve means between the pumping unit and the nozzle may include fluid flow restricting orifices and movable valve elements which are adapted to progressively control the size of the restricting orifices thereby regulating the flow of liquid fuel therethrough. Thees valve elements may in turn be adjustably positioned by suitable valve actuator means. In order to maintain a uniform fuel flow for a given setting of the valve elements, the characteristics of the pumping unit must be such that the pressure differential across the fuel flow control valve means is substantially constant throughout the entire operating speed range of the power plant.

Accordingly, it is an object of my present invention to provide a fuel and air pumping unit of the type briefly set forth above wihch will fulfill the above mentioned operating requirements.

Another object of my present invention is to provide a fuel and air pumping unit for use with the fuel control system of a liquid fuel combustion apparatus, said fuel combustion apparatus employing a combustion chamber and a compressed air pumping unit for supplying the combustion chamber with pressurized air, wherein the delivery pressures of the fuel and air supplied by the pumping unit are proportional to the discharge pressure of the compressed air pumping unit.

Another object of my present invention is to provide a fuel and air pumping unit for use with a fuel combustion apparatus as previously set forth, said fuel combustion apparatus including a liquid fuel air atomizing nozzle adapted to be supplied through suitable conduits with liquid fuel and air by said fuel and air pumping unit, said fuel combustion apparatus further including a fuel control valve means for regulating the flow of fuel from the fuel and air pumping unit to the nozzle, wherein means are provided for adapting the pumping unit to maintain a substantially constant fuel pressure differential across the above mentioned fuel control valve means during substantial variations in the operating characteristics of the combustion apparatus.

Another object of my present invention is to provide a fuel and air pumping unit as set forth in the preceding objects wherein means are provided for utilizing the pressure of the intake air pumping unit to supplement the discharge pressures of the fuel and air pumping unit.

Another object of my present invention is to provide a pumping unit, as set forth in the preceding objects, which is adapted to maintain a substantially constant differential between the discharge pressure of the intake air pumping unit and the fuel delivery pressure and between the discharge pressure of the air pumping unit and the fuel delivery pressure.

Another object of my present invention is to provide a fuel and air pumping unit which is adapted to be used with a fuel control system of a liquid fuel combustion apparatus and which is further adapted to maintain a uniform pressure differential between an air intake means and an air discharge means and between fuel intake means and a fuel discharge means, each of said intake and discharge means including portions operatively associated with the pumping unit.

Another object of my present invention is to provide a fuel and air pumping unit for use with a fuel control system, as set forth above, which includes a means for automatically regulating the rates of fuel and air delivery in accordance with the fuel and air requirements of the fuel control system.

Another object of my present invention is to provide a fuel and air pumping unit of the type set forth above which comprises separate fuel and air working chambers partly defined by movable wall members, said movable wall members being adapted to be actuated to produce intermittent fuel and air delivery pressures in delivery conduits communicating with said chambers, and which includes a surge chamber means for maintaining the fuel delivery pressure at a substantially constant value and for eliminating fuel pressure pulses in the fuel delivery conduit.

A further object of my present invention is to provide a new and improved fuel and air pumping unit which is possessed of advantageous operating characteristics and which is simple and compact in design.

Other objects and features will readily become apparent from the following description of one preferred form of my invention.

In carrying forth the foregoing objects, I have provided a fuel and air pumping unit which comprises a housing adapted to form a pair of working chambers, one of these chambers functioning as a liquid fuel working chamber and the other functioning as an air working chamber. Separate intake and discharge passage means are provided for each working chamber and suitable valve means may be provided therein for controlling the flow of liquid fuel and air into and out of each of the respective chambers. The intake passage means for the liquid fuel working chamber may be connected to a suitable fuel reservoir and the discharge passage means therefor may communicate with a liquid fuel air atomizing nozzle through a suitable fuel control valve means as previously mentioned.

The intake passage means for the air working chamber may be connected to the discharge side of an intake air pumping unit for a combustion apparatus of the type previously referred to and the discharge passage means for the air working chamber may be connected to the above mentioned liquid fuel air atomizing nozzle.

Each of the working chambers is partly defined by a flexible spring loaded working diaphragm which may be deflected by means of a suitable actuating shaft integrally secured thereto. Suitable passage means are provided within the housing for conducting air from the intake air passage means to one side of the working diaphragm for the air chamber, hereinafter referred to as the air diaphragm, to supplement the working effort of an associated diaphragm actuating spring means. Other passage means are provided for conducting air from the discharge side of the air chamber to one side of the working diaphragm for the fuel chamber, hereinafter referred to as the fuel diaphragm, to supplement the working effort of another diaphragm actuating spring means which is associated with the fuel chamber.

The total discharge pressure for the air chamber is therefore equal to the sum of the pressure produced by the diaphragm actuating spring for the air chamber and the discharge pressure of the above mentioned intake air pumping unit. Similarly, the total discharge pressure for the fuel chamber is equal to the sum of the pressure produced by the diaphragm actuating spring means for the fuel chamber and the total discharge pressure of the above-described air chamber.

The actuating shafts for the diaphragms of the air chamber of the fuel chamber may each be actuated by a cam operated rocker shaft suitably mounted within the pump housing and the actuating cam for the rocker shaft may be drivably connected to the compressor drive shaft of the fluid combustion apparatus. The connections between the rocker shaft and each of the diaphragm operated shafts are preferably of the lost motion type and are adapted to move the respective shafts in one direction only. The spring means associated with each of the fuel and air working chambers is effective to return the fuel and air diaphragms in the other direction to provide a working stroke for the respective working chambers. If the fuel or air pumping requirements are reduced during the operation of the combustion apparatus, the rate at which the fuel or air diaphragms are actuated by the associated spring means is correspondingly retarded by virtue of the lost motion connection between the above-mentioned rocker shaft and the diaphragm actuator shafts. The pumping unit therefore incorporates an inherent flow control means for regulating the rate of delivery of both fuel and air in response to variations in the pumping requirements.

The pump housing is further adapted to form a surge chamber which is partly defined by a spring loaded, flexible surge diaphragm. An auxiliary air passage means interconnects the surge chamber with the discharge passage means for the air working chamber. The force exerted on the surge diaphragm by a surge diaphragm biasing spring and by the air chamber discharge pressure is effective to pressurize the fuel delivery conduit during the time interval between successive working strokes of the fuel diaphragm.

For the purpose of more particularly describing my instant invention, reference will be made to the accompanying drawings wherein:

FIGURE 1 shows a schematic representation of the gas turbine power plant employing a fuel system which is adapted to incorporate a fuel and air pumping unit of my instant invention;

FIGURE 2 is a partial schematic elevation view of the fuel and air pumping unit of my instant invention as viewed along section line 2—2 of FIGURE 1 and it shows a suitable means for actuating the above-mentioned rocker shaft;

FIGURE 3 is a cross sectional view of the pumping unit of my instant invention;

FIGURE 4 is a cross sectional view of the pumping unit of FIGURE 3 and is taken along the section lines 4—4 of FIGURE 3; and FIGURE 5 is a schematic representation of a fuel control system embodying the fuel and air pumping unit of my instant invention, said system including in combination with the pumping unit, a fuel control valve means, an air atomizing nozzle, and suitable interconnecting conduit structure.

Referring first to FIGURE 1, the gas turbine power plant comprises a compressor unit generally designated by numeral 10, a liquid fuel combustion chamber generally designated by numeral 12, and a two-stage turbine assembly generally designated by numeral 14. The compressor unit 10 comprises a rotor element 16 which is adapted to conduct air from an inlet air passage means 18 and to discharge the same radially into a suitable diffuser and conduit structure shown schematically at 20. Upon entering the structure 20, the intake air temperature and pressure increases and the intake air is then conducted through a suitable regenerator portion 22 where the temperature is further increased. The heated intake air is conducted to a burner cone 24 which forms a portion of the combustion chamber 12. A liquid fuel nozzle 26 is adapted to supply a combustible spray pattern of liquid fuel to the interior of the burner cone 24 and the combustion products produced as a result of the combustion of the liquid fuel are conducted through the primary stage 28 of the turbine assembly 14 thereby powering the same. The primary turbine stage 28 is drivably connected to the compressor rotor 16 through a compressor drive shaft 30. The motive gases then pass through a second turbine stage 32 thereby imparting a driving torque to the turbine output shaft 34 which is drivably connected to the input pinion of a speed reduction transmission 36, said transmission being drivably connected to a suitable power absorbing means such as the vehicle driving wheels of an automotive vehicle.

The exhaust gases passing from the secondary stage 32 are conducted to a suitable conduit structure 38 to another regenerator portion 40 where a transfer of thermal energy takes place between the relatively cool intake air passing through the regenerator portion 22 and the heated exhaust gases passing through this regenerator portion 40. The exhaust gases are then passed through a suitable exhaust port shown schematically at 42.

An accessory drive gear means is shown generally at 44 and the input driving gear thereof is drivably connected to the compressor drive shaft 30, the output driven gear being drivably connected to a camshaft as shown at 46. As best seen in FIGURE 2, the camshaft 46 carries a cam element 48 which is adapted to actuate a rocker arm 50 forming a portion of the fuel pumping unit of my instant invention, said pumping unit being generally designated by numeral 52.

A fuel delivery conduit 54 interconnects the pumping unit 52 with the above-mentioned fuel nozzle 26 and the fuel control valve means 56 may be interposed in the delivery line 54, as shown. An air delivery conduit shown at 58 interconnects another portion of the pumping unit 52 with the fuel nozzle 26.

An inlet air conduit, shown at 60, interconnects a high pressure portion of the diffuser structure 20 with a pump inlet air port for the pump 52, and a fuel supply conduit, shown at 62, interconnects a fuel inlet port for the pump 52 with a suitable fuel reservoir 64.

Referring more particularly to the cross sectional views of FIGURES 3 and 4, the pumping unit 52 of my instant invention comprises a multiple piece cast housing structure having a center portion 66, said center portion 66 including an interior chamber 68 and a lateral side opening 70 which interconnects the interior chamber 68 with the exterior of the pump. A lower housing portion is provided at 72 and is secured to the lower surface of the intermediate housing portion 66 and is separated therefrom by means of a flexible fuel diaphragm element 74. This fuel diaphragm element 74 is secured at its periphery between the mating surfaces of the housing portions 66 and 72 and is extended transversely across a recess 76 formed in the lower surface of the housing portion 66. The recess 76 includes a circular depressed portion 78 within which is disposed a compression spring means 80 which is adapted to bias the flexible fuel diaphragm element 74 in a downward direction.

The diaphragm element 74 is centrally secured to a vertically movable diaphragm actuating shaft 82, said shaft being provided with a radial shoulder element 84 against which a first clamping element 86 is positioned. The clamping element 86 is centrally apertured to receive therethrough a reduced diameter end portion 88 of the shaft 82. A second centrally apertured clamping element 90 is positioned on the reduced diameter portion 88 of the shaft 82 in juxtaposition with respect to the element 86, said elements 86 and 90 being adapted to clamp therebetween the central portion of the diaphragm element 74. A suitable fastening means 92 is secured at the end of the reduced diameter end portion 88 to retain the elements 86 and 90 in clamping engagement with the diaphragm element 74. The spring means 80 is seated on the upper surface of the clamping element 86 as shown.

The lower housing portion 72 is recessed at 94 on the upper surface thereof for the purpose of receiving the clamping element 90, said element 90 being seated on a flat bottom surface 96 of the recess 94 when the fuel diaphragm element 74 assumes a downward position.

The shaft 82 is slidably received in an axially extending opening 98 and is caused to reciprocate therein upon deflection of the fuel diaphragm element 74 to which it is secured, as previously described. A sufficient clearance exists between the depressed surface of the recess 76 to permit an appreciable deflection of diaphragm element 74, said depressed surface being designated by numeral 100. A suitable sealing means may be provided, if desired, as shown at 102.

A lower cap member, shown at 104, is positioned at the bottom side of the lower housing portion 72. A surge diaphragm element 106 is secured at the periphery thereof between juxtaposed surfaces of the housing portion 72 and the lower cap member 104. The surge diaphragm element 106 is extended transversely across a central chamber 108 defined by the cap member 104. Suitable fastening means 110 may be provided for maintaining the cap member 104 and the lower portion 72 in integrally assembled relationship with respect to the central housing portion 66.

A surge spring means 112 is disposed within the central chamber 108 formed in the cap member 104 and is adapted to bias the diaphragm element 106 in an upward direction as viewed in FIGURES 3 and 4. A spring seat member 114 may be positioned against the diaphragm 106 as shown. The bottom surface of the lower housing portion 72 may be recessed, as shown at 116, to allow a limited vertical deflection of the diaphragm to take place.

An upper housing portion is shown at 118 and is secured to the upper surface of the central housing portion 66. The adjacent surfaces of the respective housing portions 118 and 66 may be separated by a suitable gasket material 120. An upper cap member 122 is positioned on the upper side of the upper housing portion 118 and a flexible air diaphragm element 124 may be secured about its periphery between the adjacent surfaces of the cap member 122 of the housing portion 118. The cap member 122 and the upper housing portion 118 may be secured in integrally assembled relationship with respect to the housing portion 66 by means of suitable fastening means or bolts 126.

The air diaphragm element 124 is extended transversely across an upper central chamber 128 defined by the upper cap member 122 and is secured at the central portion thereof to a vertically movable actuating shaft 130. The means for securing the shaft 130 to the diaphragm element 124 comprises a first clamping element 132 and a second clamping element 134 which are centrally received on a reduced diameter end portion 136 of the shaft 130. The clamping elements 132 and 134 are disposed on opposite sides of the air diaphragm element 124 and may be held in clamping engagement therewith by suitable fastening means which may consist of a fastener head 138 and spacer elements 140 and 142. The spacer element 142 is positioned, as shown, against a shoulder 144 formed on the shaft 130.

An air spring means 145 is interposed between the upper wall of the cap member 122 and the diaphragm 124 and is adapted to bias the latter in a downward direction. The shaft 130 is slidably received within an opening 146 formed in the upper housing portion 118 and is caused to reciprocate therein upon deflection of the diaphragm element 124.

As best seen in FIGURE 3, the rocker shaft 50, which was previously referred to in the description of FIGURE 2, is mounted within the interior chamber 68 of the center housing portion 66 by means of a suitable bearing pin 150 which is received through a bearing aperture 152 in the rocker shaft 50. The pin 150 may be journalled in any suitable manner to the housing portion 66 and it extends transversely across the chamber 68 as shown. The rocker shaft 50 includes an arm 154 which extends to the exterior of the pumping unit through the aperture 70 formed in the housing portion 66. The extended end of the arm 154 functions as a cam follower and is adapted to operatively engage the cam surface of the previously mentioned cam element 48. Another arm 156 of the rocker shaft 50 extends within the interior chamber 68 and is adapted to operatively engage the end of the diaphragm actuating shaft 130, as shown at 158. The arm 156 is further provided with an opening 160 through which the diaphragm actuating shaft 82 is slidably received, said actuating shaft 82 being provided at the upper end thereof with a washer 164 which is secured in the position shown by a suitable fastening means 166.

The cam element 48 is effective to cause the rocker arm 50 to oscillate about the bearing pin 150, a suitable spring means 168 being interposed between the upper housing portion 118 and the rocker shaft arm 152 to normally bias the rocker shaft 50 in a counterclockwise direction and to maintain the arm 154 in contact with the cam element 48. When the rocker arm 50 oscillates in a clockwise direction, each of the diaphragm actuating shafts 82 and 130 are moved in an upward direction. When the rocker 50 oscillates in a counterclockwise direction, the shaft 82 and 130 are returned to the position shown in FIGURE 3 by virtue of the force exerted by the compression springs 80 and 145, respectively, said downward movement being independent of the rocker shaft 50. It is thus seen that the connections between each of the shafts 82 and 130 and the arm 156 are of the lost motion type and the rocker arm 50 is adapted to positively actuate these shafts only in one direction.

Referring to the cross sectional view of FIGURE 4, an air inlet port is shown at 170 within which is received a suitable conduit fitting 172 disposed at the end of the air delivery conduit 60. Port 170 provides communication between the conduit 60 and a vertically extending air passage portion 174 formed within the interior of the central housing portion 66. Other communicating passage portions 176, 178, and 180 are provided in the housing portion 66, housing portion 118 and cap member 122, respectively, to provide communication between the air passage portion 174 and the chamber 128. The air passage portion 174 communicates with the space below the diaphragm 124 through a one-way check valve structure 182 which comprises an orifice element 184 and a movable valve element 186. A spring means 185 is provided for biasing the valve element 186 into engagement with the orifice element 184 to permit the flow of air from the passage portion 174 into the space below the air diaphragm 124 and to prevent a flow of air in the reverse direction. This space below the air diaphragm 124 will hereinafter be referred to as the air working chamber.

The central housing portion 66 is further provided with another vertically extending air passage means 188 for accommodating the flow of air from the air working chamber below the air diaphragm 124 to an air outlet port 190, said port 190 providing communication between air delivery conduit 58 and the air passage portion 188. The delivery conduit 58 is provided with a suitable terminal fitting 192 for securing the same to the pump housing portion 66. The flow of air from the air working chamber into the passage portion 188 is controlled by a one-way check valve structure 194 which is similar in construction to the previously described valve structure 182 and which includes an orifice plate 196 together with a spring loaded valve element 198 for providing one-way flow through the orifice plate 196.

An opening is provided at 200 within the housing portion 66 for the purpose of providing communication between the air passage portion 188 and the recess 76 on the upper side of the diaphragm element 74. Also, a branch air passage means is provided at 202 for the purpose of interconnecting the lower central chamber 108 and the air passage portion 188. This branch air passage comprises three communicating portions 204, 206, and 208 formed in the housing portion 66, the housing portion 72, and the lower cap member 104, respectively. A suitable one-way check valve is provided at 210 to permit the flow of fluid from the air passage portion 188 and to prevent the flow of fluid through the branch passage 202 in the opposite direction.

A liquid fuel inlet port 212 is formed in the lower housing portion 72 to provide communication between an inlet fuel passage portion 214 and the fuel conduit 62, said fuel conduit 62 including a suitable fitting 216 at the terminal portion thereof which is threadably received within the port 212. The fuel passage portion 214 communicates with the space below the flexible diaphragm element 74 through a one-way check valve structure 218, said valve structure 218 including an apertured plate 220 and a movable valve element 222 which is spring biased against the apertured plate 220 to permit the flow of fluid from the passage portion 214 to the space below the fuel diaphragm element 74 and to prevent the flow of fuel in the reverse direction. This space below the fuel diaphragm 74 will hereinafter be referred to as the fuel working chamber.

Similarly another fuel passage portion is provided at 224 for accommodating the flow of fuel from the fuel working chamber to a fuel outlet port 226 which communicates with the fuel delivery conduit 54. This conduit 54 is provided with a suitable fitting 228 which may be threadably received within the port 226.

A one-way valve structure is provided at 230 to provide communication between the fuel working chamber and the fuel passage portion 224. The valve structure 230 is similar in construction to the valve structure 218 and it comprises an apertured plate 232 disposed transversely across the fuel passage portion 224 and a spring-biased movable valve element 234 to permit the flow of fluid into the fuel passage portion 224 and to prevent the flow of fuel in the reverse direction. An opening is provided, as shown at 235, between the passage portion 224 and a space above the surge diaphragm element 106. This space is adapted to function as a surge chamber and will be subsequently described in particular detail.

As best seen in FIGURE 5, the air atomizing nozzle 26, previously referred to in connection with the description of the power plant assembly of FIGURE 1 includes a body portion 236 and an interior nozzle element 238. A plurality of nozzle air passages 240 is provided about the periphery of the nozzle element 238 and a central nozzle fuel passage 242 is provided within the interior of the nozzle element 238. The passage 240 are connected to the air delivery conduit 58 and the passage 242 is connected to the fuel delivery conduit 54. A suitable one-way check valve structure may be provided in the fuel delivery conduit 54, as shown at 244, for preventing the reverse flow of fuel from the nozzle 26 when the operation of the engine ceases.

Branch fuel passages are provided in the nozzle element 238, as shown at 246, which intersect the air passages 240 in the vicinity of a nozzle orifice 248 formed in the nozzle body 236.

During the operation of the pumping unit of my instant invention, the rotary elements of the power plant are effective to oscillate the rocker arm 50 about the mounting pin 150 by virtue of the rotary movement of the cam element 48, as previously described. When the rocker shaft is rotated in a clockwise direction, the diaphragm elements 74 and 124 are deflected in an upward direction by virtue of the lost motion connection between the rocker shaft arm 156 and the diaphragm actuating shafts 82 and 130. During this upward stroke of the diaphragm actuating shafts, liquid fuel is caused to enter the fuel working chamber through the check valve structure 218. Simultaneously the compressed intake air is caused to enter the air working chamber through the check valve structure 182.

When the rocker shaft 50 is caused to rotate in a counterclockwise direction, the force exerted by the air spring 145 on the air diaphragm element 124 in a downward direction is effective to cause the compressed air in the air working chamber below the air diaphragm element 124 to be forced into the air passage portion 118 and the communicating air delivery conduit 58. Simultaneously, the downward force exerted by the fuel spring 80 on the fuel diaphragm element 74 is effective to force liquid fuel from the fuel working chamber below the fuel diaphragm element 74 through the check valve structure 230 into the fuel passage portion 224 and the communicating fuel delivery conduit 54. During this working stroke of the fuel diaphragm element 74, the outlet air pressure in the air passage portion 188 is effective to supplement the working effort of the fuel spring 80 by virtue of the communication provided by opening 200 between the air passage portion 188 and the fuel spring chamber defined by the recess 76.

Air pressure is delivered to the spring chamber 108 below the surge diaphragm element 106 through the branch air passage 202 during the working stroke of the air diaphragm element 124. The discharge fuel pressure in the passage portion 224 is effective to deflect the surge diaphragm element 106 in a downward direction against the upward biasing force of the surge spring 112 and the upward force exerted by the air pressure in the spring chamber 108. Upon termination of the fuel pumping stroke, fuel pressure may be maintained in the fuel delivery conduit 54 by virtue of the combined forces exerted by the spring 112 and this pressure within the spring chamber 108. The surge diaphragm 106 is thereby effective to substantially eliminate large variations in the magnitude of the fuel delivery pressure during the operation of the pumping unit.

The working effort provided by the air spring 145 is supplemented by the air pressure which is transmitted to the chamber 128 through the branch passage portions 176, 178, and 180.

It is thus apparent from the foregoing description that the total air discharge pressure delivered by the air working chamber of the pumping unit of my instant invention will at all times be greater than the pressure which exists in the combustion chamber of the fuel combustion apparatus. The magnitude of this pressure differential will be substantially constant and will be equal to the air pressure produced by the biasing force of the air spring 145.

It is likewise apparent that the fuel discharge pressure delivered by the fuel working chamber of my presently disclosed pumping unit will at all times be greater than the pressure which exists in the combustion chamber and the magnitude of this pressure differential will be equal to the magnitude of the fuel pressure which is produced by the biasing force of fuel spring 80 plus the above mentioned air pressure differential produced by the air spring 145.

It is apparent that the total fuel delivery pressure wiill be larger than the total air delivery pressure and this difference in pressure is sufficient to cause the surge spring 112 to become compressed during the working stroke of the air and fuel diaphragms. During the succeeding intake stroke for the air and fuel working chambers, the surge diaphragm will be operative to maintain a substantially constant fuel discharge pressure in the fuel delivery line as previously pointed out.

When the fuel and air delivery requirements of the fuel combustion apparatus are temporarily reduced to some very small value during operation, the fuel and air diaphragms will remain in an upward position, as viewed in FIGURES 3 and 4, and the rocker shaft 50 will be ineffective to cause a further pumping action to take place. For example, during the operation of the engine if the fuel control valve elements comprising the valve means 56 are caused to reduce the fuel metering rate there will be a tendency for the fuel pressure to build-up on the upstream side of the valve means 56. This increase in fuel pressure will tend to reduce the length of the stroke of the fuel diaphragm actuating shaft 82 since the fuel spring will be effective to move the diaphragm 74 only until the spring force equals the upward force exerted on the fuel diaphragm 74 by the fuel pressure within the pumping chamber. Similarly, if the air delivery passages or the fuel passages within the fuel air nozzles become clogged, a pressure buildup will occur on the air delivery side of the air pumping portion of the unit. This will cause a pressure buildup in the air pumping chamber which will prevent the air spring from returning the air diaphragm 124 to its fully retracted position. The air pumping capacity of the unit is thus accordingly reduced. If one of the branch passages 246 should become clogged, the air delivery rate through the remaining passages 246 will remain substantially constant by reason of this inherent air flow control feature which is made possible by the accompanying reduced working stroke of the air diaphragm. This feature is made possible by virtue of the lost motion connection between the rocker shaft and the diaphragm actuator shafts and by virtue of the independent operation of the fuel and air working springs. The pumping unit therefore incorporates an inherent flow limiting means and thus requires no separate relief valve. The pumping unit is effective to deliver fuel and air only at a rate which is sufficient to meet the operating requirements of the combustion apparatus.

Further, if the fuel and air delivery requirements are only moderately reduced, the rate of deflection of the fuel and air diaphragms during their respective working strokes is correspondingly reduced.

While I have described one preferred form of my present invention, it is apparent that many modifications thereof may be made without departing from the scope of my invention as defined by the appended claims.

What I claim and desire to secure by United States Letters Patent is:

1. In a fuel combustion apparatus including a rotary element, a combustion chamber for producing motive gases for powering said rotary element, a liquid fuel and air nozzle disposed in said combustion chamber for supplying the latter with a combustible spray pattern of liquid fuel, separate air and fuel conduit means extending to said nozzle for delivering liquid fuel and air thereto, and an air compressor unit drivably connected to said rotary element and adapted to supply said combustion chamber with compressed air to support combustion therein; a fuel and air pumping unit comprising an air working chamber, a liquid fuel working chamber, said air chamber and said fuel chamber being respectively partly defined by separate movable wall members, spring means acting on one side of each movable wall member for biasing the latter in one direction to decrease the volume of said working chambers, a lever means for positively actuating said movable wall members in the other of said directions, a valve controlled air delivery conduit means and a valve controlled fuel delivery conduit means respectively interconnecting said nozzle with said air working chamber and said fuel working chambers, an inlet conduit means connecting said air working chamber with said air compressor unit for delivering a supply of compressed air to said air working chamber, branch passage means for conducting compressed air from said inlet conduit means to said one side of the movable wall member for said air working chamber, and means for maintaining a differential between the pressures in the delivery conduit means of said fuel and air working chambers which is substantially proportional to the force exerted by the biasing spring means for the wall member of said fuel working chamber and which is substantially independent of the force exerted by the biasing spring means for the wall member of said air working chamber comprising other branch passage means for conducting air from the delivery conduit means connected to said air working chamber to said one side of the movable wall member for said fuel working chamber.

2. A liquid fuel and air pumping unit comprising a housing, a liquid fuel working chamber disposed in one portion of said housing, an air working chamber disposed in another portion of said housing, a separate movable wall member partly defining each of said working chambers, a fuel inlet conduit means and a fuel delivery conduit means communicating with said fuel working chamber, an air inlet conduit means and an air delivery conduit means communicating with said air working chamber, linkage means for positively actuating said movable wall members in one direction, a spring means disposed on one side of each of said movable wall members for respectively biasing the same in the opposite direction independently of said linkage means, a branch passage means for providing communication between said air inlet conduit means and said one side of the movable wall member for said air working chamber, and means for maintaining a differential between the pressures in the delivery conduit means of said fuel and air working chambers which is substantially proportional to the force exerted by the biasing spring means for the wall member of said fuel working chamber and which is substantially independent of the force exerted by the biasing spring means for the wall member of said air working chamber comprising other branch passage means for providing communication between said air delivery conduit means and said one side of the movable wall member for said fuel working chamber.

3. A liquid fuel and air pumping unit comprising a housing, a liquid fuel working chamber disposed in one portion of said housing, an air working chamber disposed in another portion of said housing, a flexible diaphragm partly defining each of said working chambers, a shaft centrally secured to each of said diaphragms, a lever pivoted to a portion of said housing and having one arm thereof in engagement with each of said shafts, another arm of said lever being adapted to be actuated to provide for an oscillating movement of said lever about its pivot, said one lever arm being adapted to move said shafts and to deflect said diaphragms in one direction when said lever is oscillated in one direction, spring means disposed on one side of each diaphragm for respectively biasing and moving the same in the opposite direction independently of said lever when the latter oscillates in the opposite direction, air inlet conduit means and air delivery conduit means communicating with said air working chamber, fuel inlet conduit means and fuel delivery conduit means communicating with said fuel working chamber, first branch passage means interconnecting said air inlet conduit means and said one side of the diaphragm for said air working chamber, and means for maintaining a differential between the pressures in the delivery conduit means of said fuel and air working chambers which is substantially proportional to the force exerted by the biasing spring means for the diaphragm of said fuel working chamber and which is substantially independent of the force exerted by the biasing spring means for the diaphragm of said air working chamber comprising second branch passage means interconnecting said air delivery passage means and said one side of the diaphragm for said fuel working chamber.

4. A liquid fuel and air pumping unit comprising a housing, a liquid fuel working chamber disposed in one portion of said housing, an air working chamber disposed in another portion of said housing, a flexible diaphragm partly defining each of said working chambers, a shaft centrally secured to each of said diaphragms, a lever pivoted to a portion of said housing and having one arm thereof in engagement with each of said shafts, another arm of said lever being adapted to be actuated to provide for an oscillating movement of said lever about its pivot, said one lever arm being adapted to move said shafts and to deflect said diaphragms in one direction when said lever is oscillated in one direction, spring means disposed on one side of each diaphragm for respectively biasing and moving the same in the opposite direction independently of said lever when the latter oscillates in the opposite direction, air inlet conduit means and air delivery conduit means communicating with said air working chamber, fuel inlet conduit means and fuel delivery conduit means communicating with said fuel working chamber, first branch passage means interconnecting said air inlet conduit means and said one side of the diaphragm for said working chamber, means for maintaining a differential between the pressures in the delivery conduit means of said fuel and air working chambers which is substantially proportional to the force exerted by the biasing spring means for the diaphragm of said fuel working chamber and which is substantially independent of the force exerted by the biasing spring means for the diaphragm of said air working chamber comprising second branch passage means interconnecting said air delivery passage means and said one side of the diaphragm for said fuel working chamber, a surge chamber comprising another flexible diaphragm partly defining the same, said surge chamber being in communication with said fuel delivery conduit means, and third branch passage means interconnecting said air delivery conduit means and one side of said other flexible diaphragm externally of said surge chamber.

5. A liquid fuel and air pumping unit comprising a housing, a liquid fuel working chamber disposed in one portion of said housing, an air working chamber disposed in another portion of said housing, a flexible diaphragm partly defining each of said working chambers, a shaft centrally secured to each of said diaphragms, a lever pivoted to a portion of said housing and having one arm thereof in engagement with each of said shafts, another arm of said lever being adapted to be actuated to provide for an oscillating movement of said lever about its pivot, said one lever arm being adapted to move said shafts and to deflect said diaphragms in one direction when said lever is oscillated in one direction, spring means disposed on one side of each diaphragm for respectively biasing and moving the same in the opposite direction independently of said lever when the latter oscillates in the opposite direction, air inlet conduit means and air delivery conduit means communicating with said air working chamber, fuel inlet conduit means and fuel delivery conduit means communicating with said fuel working chamber, first branch passage means interconnecting said air inlet conduit means and said one side of the diaphragm for said air working chamber, means for maintaining a differential between the pressures in the delivery conduit means of said fuel and air working chambers which is substantially proportional to the force exerted by the biasing spring means for the diaphragm of said fuel working chamber and which is substantially independent of the force exerted by the biasing spring means for the diaphragm of said air working chamber comprising second branch passage means interconnecting said air delivery passage means and said one side of the diaphragm for said fuel working chamber, and spring means acting against said one side of said other flexible diaphragm.

6. A compound fluid pumping unit comprising two fluid pumping chambers, each of said pumping chambers being defined in part by separate movable walls, separate resilient means yieldably urging said walls in pumping strokes, means for intermittently moving said walls in opposition to the resilient means associated with said walls, a fluid supply passage means and a delivery passage means communicating with each of said pumping chambers, and means for maintaining a differential between the pressures in the delivery passage means of the two pumping chambers which is substantially independent of the pressure in the delivery passage means of one of said pumping chambers comprising an auxiliary passage means for conducting fluid pressure from the fluid delivery passage means for said one pumping chamber to the movable wall partly defining the other pumping chamber to assist the resilient means associated with the latter wall in urging said pumping strokes thereof.

7. A compound fluid pumping unit comprising two fluid pumping chambers, each of said pumping chambers being defined in part by a movable wall, separate resilient means yieldably urging said walls in pumping strokes, means for intermittently moving said walls in opposition to the resilient means associated with said walls, fluid supply and delivery passage means communicating with each of said pumping chambers, means for maintaining a differential between the pressures in the delivery passage means of the two pumping chambers which is substantially independent of the pressure in the delivery passage means of one of said pumping chambers comprising a first auxiliary passage means for conducting fluid pressure from the fluid delivery passage means communicating with said one working chamber to the movable wall partly defining the other working chamber to assist the resilient means associated with the latter wall in urging said pumping strokes thereof, and a second auxiliary passage means for conducting fluid pressure from the fluid supply passage means communicating with said one pumping chamber to the movable wall partly defining said one pumping chamber to assist the resilient means associated with the latter wall in urging said pumping strokes thereof.

8. A compound fluid pumping unit comprising two fluid pumping chambers, each of said pumping chambers being defined in part by separate movable walls, separate resilient means yieldably urging said walls in pumping strokes, means for intermittently moving said walls in opposition to the resilient means associated with said walls, a fluid supply passage means and a delivery passage means communicating with each of said pumping chambers, means for maintaining a differential between the pressures in the delivery passage means of the two pumping chambers which is substantially independent of the pressure in the delivery passage means of one of said pumping chambers comprising an auxiliary passage means for conducting fluid pressure from the fluid delivery passage means communicating with said one pumping chamber to the movable wall partly defining the other pumping chamber to assist the resilient means associated with the latter wall in urging said pumping strokes thereof, and a surge chamber comprising one portion communicating with the delivery passage means for said other pumping chamber and another portion communicating with one of the passage means communicating with said one pumping chamber, said surge chamber portions being separated by another movable wall.

9. A compound fluid pumping unit comprising an air pumping chamber and a fuel pumping chamber, each of said pumping chambers being defined in part by separate movable walls, separate resilient means yieldably urging said walls in pumping strokes, means for intermittently moving said walls in opposition to the resilient means associated with said walls, a fluid supply passage means and a fluid delivery passage means communicating with each of said pumping chambers, an auxiliary passage connecting the fluid supply passage means for said air pumping chamber with the movable wall for the latter chamber to assist the resilient means associated with the latter wall in urging the pumping strokes thereof, and means for maintaining a differential between the pressures in the delivery passage means of said fuel and air pumping chambers which is substantially independent of the pressure in the delivery passage means of said air pumping chamber comprising an auxiliary passage connecting the fluid delivery passage means for said air pumping chamber with the movable wall for the fuel pumping chamber to assist the resilient means associated with the latter wall in urging the pumping strokes thereof.

References Cited in the file of this patent

UNITED STATES PATENTS

| | | |
|---|---|---|
| 2,151,043 | Paton | Mar. 21, 1939 |
| 2,570,560 | Katcher | Oct. 9, 1951 |
| 2,595,759 | Buckland et al. | May 6, 1952 |
| 2,610,464 | Knoll | Sept. 16, 1952 |
| 2,635,425 | Thorpe et al. | Apr. 21, 1953 |
| 2,819,588 | Sarto | Jan. 14, 1958 |